United States Patent
Christian et al.

(10) Patent No.: US 10,246,835 B1
(45) Date of Patent: Apr. 2, 2019

(54) METHOD AND APPARATUS FOR SPREADING CHIPS ON ROADWAY USING FOAMED ASPHALT CEMENT

(71) Applicant: Roadtec, Inc., Chattanooga, TN (US)

(72) Inventors: Richard Christian, Chattanooga, TN (US); Raymond Clark Baker, IV, Chattanooga, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 16/185,267

(22) Filed: Nov. 9, 2018

Related U.S. Application Data (63) Continuation-in-part of application No. 16/137,716, filed on Sep. 21, 2018.

(Continued)

(51) Int. Cl.
| | |
|---|---|
| *E01C 19/21* | (2006.01) |
| *E01C 23/06* | (2006.01) |
| *B60P 1/04* | (2006.01) |
| *B60P 3/22* | (2006.01) |
| *E01C 19/20* | (2006.01) |

(Continued)

(52) U.S. Cl.
CPC ............... *E01C 23/06* (2013.01); *B60P 1/04* (2013.01); *B60P 3/2245* (2013.01); *E01C 7/182* (2013.01); *E01C 7/24* (2013.01); *E01C 11/005* (2013.01); *E01C 19/174* (2013.01); *E01C 19/20* (2013.01); *E01C 19/21* (2013.01); *E01C 2019/207* (2013.01)

(58) Field of Classification Search
CPC .......... E01C 19/00; E01C 19/12; E01C 19/15; E01C 19/16; E01C 19/17; E01C 19/20; E01C 19/21; E01C 19/45; E01C 19/46

USPC .......................... 404/75, 101, 108, 110, 111
See application file for complete search history.

(56) References Cited

U.S. PATENT DOCUMENTS

| | | | | |
|---|---|---|---|---|
| 3,100,425 A | * | 8/1963 | Cartwright ............ | E01C 19/174 239/100 |
| 4,226,552 A | * | 10/1980 | Moench .............. | E01C 19/1036 366/1 |

(Continued)

*Primary Examiner* — Gary S Hartmann
(74) *Attorney, Agent, or Firm* — Chambliss, Bahner & Stophel, P.C.

(57) ABSTRACT

A chip sealing train for use in carrying out a chip sealing operation on a roadway using foamed asphalt cement includes a chip supply dump truck, an asphalt cement supply truck and a chip spreader. The chip spreader includes a receiving hopper for receiving stone chips from the raised dump bed of the chip supply dump truck and a spreader assembly which is adapted to dispense the stone chips onto the roadway. The chip sealing train includes a water tank and a foam dispersal assembly. The foam dispersal assembly includes a foaming chamber, an asphalt cement supply line that is in fluid communication with the asphalt cement supply truck and the foaming chamber, and an asphalt cement pump for pumping asphalt cement from the asphalt cement supply tank into the foaming chamber. The foam dispersal assembly also includes a water supply line that is in fluid communication with the water tank and the foaming chamber, and a water pump for pumping water from the water tank into the foaming chamber. A spray bar is adapted to dispense foamed asphalt cement from the foaming chamber onto the surface of the roadway in front of the spreader assembly.

10 Claims, 6 Drawing Sheets

Related U.S. Application Data

(60) Provisional application No. 62/580,766, filed on Nov. 2, 2017, provisional application No. 62/586,610, filed on Nov. 15, 2017.

(51) Int. Cl.
*E01C 11/00* (2006.01)
*E01C 7/18* (2006.01)
*E01C 7/24* (2006.01)
*E01C 19/17* (2006.01)

(56) References Cited

U.S. PATENT DOCUMENTS

| | | | | |
|---|---|---|---|---|
| 5,865,563 | A * | 2/1999 | Bonds | E01C 19/00 404/108 |
| 6,483,804 | B1 * | 11/2002 | Muller | H04L 49/602 370/230 |
| 6,805,516 | B2 * | 10/2004 | Barnat | E01C 19/21 404/101 |
| 7,572,081 | B2 * | 8/2009 | Buschmann | E01C 19/17 404/101 |
| 7,632,038 | B2 * | 12/2009 | Buschmann | E01C 19/48 404/101 |
| 7,798,744 | B2 * | 9/2010 | Larson | E01C 19/21 404/101 |
| 9,765,487 | B2 * | 9/2017 | Harrison, Jr. | E01C 19/21 |
| 9,879,386 | B2 * | 1/2018 | Marsolek | E01C 19/00 |
| 9,956,917 | B1 * | 5/2018 | Neisen | B60R 3/02 |

* cited by examiner

METHOD AND APPARATUS FOR SPREADING CHIPS ON ROADWAY USING FOAMED ASPHALT CEMENT

CROSS-REFERENCE TO RELATED APPLICATIONS

This application is a continuation-in-part of U.S. patent application Ser. No. 16/137,716 which was filed on Sep. 21, 2018 and claims the benefit of U.S. Provisional Patent Application No. 62/580,766 that was filed on Nov. 2, 2017. This application also claims the benefit of U.S. Provisional Patent Application No. 62/586,610 which was filed on Nov. 15, 2017.

FIELD OF THE INVENTION

The invention relates generally to a method and apparatus for carrying out a chip sealing operation on a roadway. More particularly, the invention relates to methods and devices for use in carrying out a chip sealing operation using foamed asphalt cement as a binder.

BACKGROUND AND DESCRIPTION OF THE PRIOR ART

Roadway repair is often accomplished by overlaying the existing pavement (whether of concrete or asphalt paving material) with a new layer (often called a leveling course) of concrete or asphalt paving material. This is an expensive and time-consuming process and is not always necessary. An alternative is to employ a chip sealing process for extending the useful life of the existing roadway. The typical cost of a chip sealing process is 20-25% of the cost of a conventional asphalt overlay. In the chip sealing process, a binder composition including asphalt cement is applied to the surface of the existing roadway, and then a layer of stone chips having high durability and high fracture plane characteristics is spread over the asphalt composition.

A chip seal is designed to seal and protect a pavement from oxidation and weathering by sealing the small cracks in a pavement surface and thereby preventing the intrusion of water into the pavement surface. A chip seal can also be used to address raveling (loss of aggregate), to correct bleeding and flushing problems, to improve skid resistance and generally to extend the pavement life. Chip seals are not suited for all pavements; the existing structure should be sound, with only minor surface defects. Consequently, chip seals are typically applied to pavements that are in relatively good condition with no underlying structural damage. When a chip seal is applied to a pavement in relatively good condition, an additional six to eight years of service may be expected. For more distressed pavements, less service extension can be expected (four to six years on pavements in fair condition and three to four years for pavements in poor condition).

Different types of asphalt cement binder compositions can be used in a chip sealing process. The composition may be applied with or without heating. Asphalt cement binder compositions that are applied without heating in conventional chip sealing operations include modified and unmodified asphalt cement emulsions. Compositions that are applied hot in conventional chip sealing operations can include polymer-modified asphalt cements, polymer-modified asphalt cements blended with rubber or crumb rubber and unmodified asphalt cements. The appropriate binder type is selected based on pavement condition, climate, aggregate properties, and desired service life and cost considerations.

The amount of binder that is applied must be carefully controlled to obtain optimal results. It is desirable to use sufficient binder to bond the chips to the roadway surface, but not so much that the binder bleeds to the upper surface of the roadway over time. When the binder comprises a paving grade asphalt cement, it is difficult to apply enough binder to hold the chips in place on the roadway without significant bleed over. This allows the asphalt cement to be tracked by the wheels of the vehicles that are passing along the roadway. Consequently, in many conventional chip sealing processes, an emulsion is formed of asphalt cement and about 30% water. This emulsified mixture is then applied to the road using an asphalt emulsion supply truck equipped with a spray assembly. However, when the binder comprises an asphalt cement emulsion, the water in the emulsion begins to evaporate as soon as the emulsion meets the road surface. Furthermore, even if the chips are applied before much water has evaporated, the emulsion will tend to settle to the surface of the roadway, leaving much of the surface area of the chips without any binder material. Subsequent vehicular traffic will tend to dislodge the chips from the thin layer of emulsion on the roadway, resulting in an inferior and short-lived repair. One solution to these challenges is to apply a second layer of asphalt cement emulsion (i.e., a fog coat) over the completed chip-sealed roadway.

It would be desirable if a chip sealing method and apparatus could be developed that would avoid the problems associated with conventional chip sealing operations.

Advantages of the Preferred Embodiments of the Invention

Among the advantages of the invention is that it provides a chip sealing method that permits chip sealing to be carried out in such a manner that the chips are substantially coated with the asphalt cement binder material without substantial bleed over of binder material.

Other advantages of the invention include providing a chip sealing method and apparatus that permits chip sealing to be carried out without having the wheels of any vehicle drive on the chip-free asphalt binder composition on the roadway surface. Furthermore, when a chip sealing operation is carried out according to an embodiment of the invention utilizing a chip sealing train that includes a chip supply dump truck, a modified chip spreader (as described in some detail hereinafter) and an asphalt cement supply truck, all three vehicles are able to travel in a forward direction, i.e., with the operator of each vehicle facing forward in the chip spreading direction.

Still other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, couplings and the like, such as "attached", "coupled", "connected" and "interconnected", refer to a relationship wherein structures are secured or attached to one another either directly or indirectly through intervening structures, as well as both moveable and rigid attachments or relationships, unless specified herein or clearly indicated by context. The terms "operatively attached" and "operatively connected" describe such an attachment, coupling or connection that allows the pertinent structures to operate as intended by virtue of that relationship. The term "fluid communication" refers to such an attachment, coupling or connection that allows for the flow of fluid from one such structure or component to or by means of the other.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "foamed asphalt cement" refers to an asphalt binder composition that is made by mixing hot liquid asphalt cement with cold water or with cold water and air in a mixing or foaming chamber. Foamed asphalt cement is characterized by a phase change of the cold water to steam when it comes into contact with the hot asphalt cement in the mixing or foaming chamber. Foamed asphalt cement is distinguishable from an emulsion of cold asphalt cement and water.

The term "chip sealing train" refers to a combination of a chip supply dump truck, a chip spreader and an asphalt cement supply truck that are used together in a chip sealing operation.

The term "chip spreading direction" is the direction of travel of the components of the chip sealing train during the chip sealing operation.

The term "in front of" and similar terms refer to an assembly, component or portion of a chip spreader or a component of a chip sealing train that is in the chip spreading direction with respect to a reference point, assembly, component or portion of the chip spreader or component of the chip sealing train.

The term "front end" and similar terms, when used with respect to a chip sealing train or a vehicular component of a chip sealing train, refer to a relative location or direction towards the leading end of the chip sealing train or a vehicular component thereof as it travels in the chip spreading direction.

The term "behind" and similar terms refer to an assembly, component or portion of a chip spreader or a component of the chip sealing train that is in the direction opposite the chip spreading direction with respect to a reference point, assembly, component or portion of the chip spreader or component of the chip sealing train.

The terms "rear end" and similar terms, when used with respect to a chip sealing train or a vehicular component of a chip sealing train, refer to a relative location or direction towards the trailing end of the chip sealing train or a vehicular component thereof as it travels in the chip spreading direction.

The term "modified chip spreader" refers to a chip spreader which has been modified: (a) by the addition of an asphalt composition flow system including a foaming chamber and a spray assembly that is mounted in front of the chip spreader and is adapted to dispense foamed asphalt cement across the surface of the roadway; and (b) so that the operator of the modified chip spreader may face forward when the modified chip spreader travels in the chip spreading direction. Modified chip spreaders include retrofitted conventional chip spreaders and new machines that are designed to function as described herein.

SUMMARY OF THE INVENTION

The invention comprises a method and apparatus for carrying out a chip sealing process using foamed asphalt cement. A first embodiment of the apparatus comprises a chip sealing train including a chip supply dump truck, a conventional chip spreader, and an asphalt cement supply truck that is modified to permit the dispersal of foamed asphalt cement on the roadway. In this embodiment of the invention, the asphalt cement supply truck includes a cement tank for containing hot asphalt cement, a water tank, and a foam dispersal assembly comprising a spray bar that extends across the roadway. The foam dispersal assembly includes a foaming chamber, an asphalt cement supply line from the cement tank to the foaming chamber and a water supply line from the water tank to the foaming chamber. The chip spreader in this embodiment of the invention is a self-propelled vehicle that has a receiving hopper on its rear end, a spreader assembly including a spreader hopper on its front end, and a conveyor assembly for conveying stone chips from the receiving hopper to the spreader assembly. When the chip supply dump truck is operatively attached to the chip spreader, and the dump bed of the chip supply truck is raised, stone chips will fall into the receiving hopper of the chip spreader. The modified asphalt cement supply truck is operated to drive along the roadway dispensing foamed asphalt cement onto the roadway. The foaming process greatly increases the volume of the asphalt cement binder. As the chip spreader is driven along the roadway in the chip spreading direction, closely behind the modified asphalt cement supply truck, the conveyor assembly is operated to convey stone chips to the spreader assembly which dispenses stone chips on the newly applied foamed asphalt cement on the roadway. Because the foamed asphalt cement on the roadway has a much greater volume than liquid asphalt cement or an asphalt cement emulsion, it will engulf the chips on the roadway. Furthermore, because the foamed asphalt cement has a greater viscosity than does an asphalt cement emulsion, it will tend to cling to the chips on the roadway even as the foam breaks down. What results is a chip seal that is more durable and less likely to bleed over than conventional chip seals.

In a second embodiment of the invention, the chip sealing train includes a modified chip spreader that is adapted to be used in a chip sealing train including a chip supply dump truck and an asphalt cement supply truck. The modified chip spreader is a self-propelled vehicle that has a receiving hopper on its front end, a spreader assembly on its rear end and a conveyor assembly for conveying stone chips from the receiving hopper to the spreader assembly. In this embodiment of the invention, the asphalt cement supply truck includes a cement tank for containing hot asphalt cement, and either the asphalt cement binder supply truck or the modified chip spreader includes a water tank. The modified chip spreader also includes a foam dispersal assembly comprising a foaming chamber and a spray bar that extends across the roadway. An asphalt cement supply line provides fluid communication from the cement tank to the foaming chamber and a water supply line provides fluid communication from the water tank to the foaming chamber. Either the asphalt cement supply truck or the modified chip spreader has an asphalt cement pump that is adapted to pump the hot asphalt cement from the cement tank to the foaming chamber and a water pump that is adapted to pump water from the water tank to the foaming chamber. It is also preferred that the modified chip spreader have a tow bar on its rear end that is operatively attached to a tow-bar hitch assembly on the front end of the asphalt cement supply truck, and a hitch assembly on its front end for coupling it to rear end of the chip supply dump truck. When the chip supply dump truck and the asphalt cement supply truck are operatively attached to the preferred modified chip spreader according to this embodiment of the invention, and the dump bed of the chip supply truck is raised, stone chips will fall into the receiving hopper of the modified chip spreader. As the preferred modified chip spreader is driven along the roadway in the chip spreading direction, pushing the chip supply dump truck and pulling the asphalt cement supply truck, the conveyor assembly is operated to convey stone chips to the spreader assembly, the foam dispersal assembly is operated to dispense foamed asphalt cement on the roadway in front of the spreader assembly, and the spreader assembly is operated to dispense stone chips onto the newly applied foamed asphalt cement on the roadway.

In order to facilitate an understanding of the invention, the preferred embodiments of the invention, as well as the best modes known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED
EMBODIMENTS OF THE INVENTION

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 1:
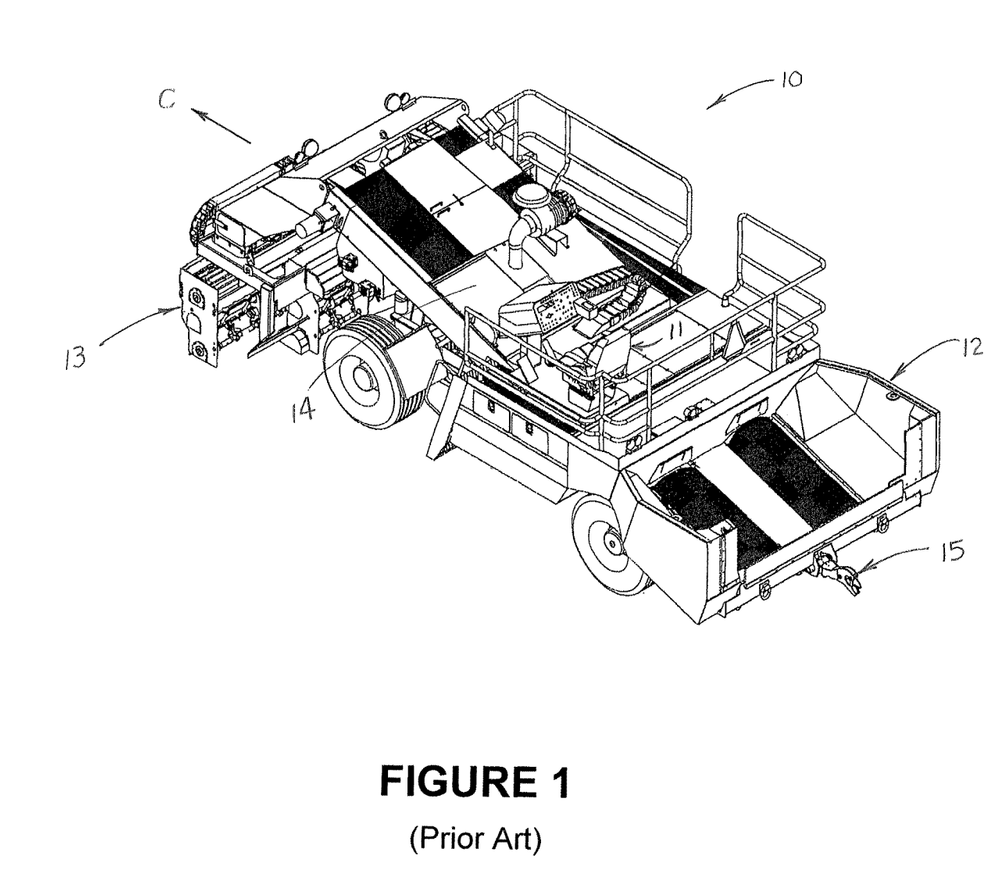
FIG. 1 is a perspective view of a conventional chip spreader that may be employed in a first embodiment of the invention.

As shown in FIG. 1, conventional chip spreader 10 is a self-propelled vehicle that is adapted to be driven in chip spreading direction "C" by an operator who is seated at operator's station 11. Chip spreader 10 is adapted to follow a conventional asphalt cement supply truck (not shown in FIG. 1) which is dispensing an asphalt cement binder composition from a spray assembly located at the rear end of the asphalt cement supply truck. Chip spreader 10 has receiving hopper 12 on its rear end and spreader assembly 13 on its front end. Receiving hopper 12 is adapted to receive chips from a chip supply dump truck (also not shown in FIG. 1), and conveyor assembly 14 is adapted to convey these chips from receiving hopper 12 to spreader assembly 13, which disperses the chips across the roadway. Hitch assembly 15 is located on the rear end of chip spreader 10 for coupling the chip spreader to the rear end of a chip supply dump truck. Since the receiving hopper can only accommodate a portion of the load of the chip supply truck, the dump bed of the chip supply truck is raised and the chip spreader is coupled to the chip supply truck for a period of time sufficient to unload the chips from the dump truck as chip spreader 10 travels in direction "C" pulling the dump truck backwards, and as chips are conveyed from the receiving hopper to the chip spreader assembly on the front end of this conventional chip spreader.

Figure 2:
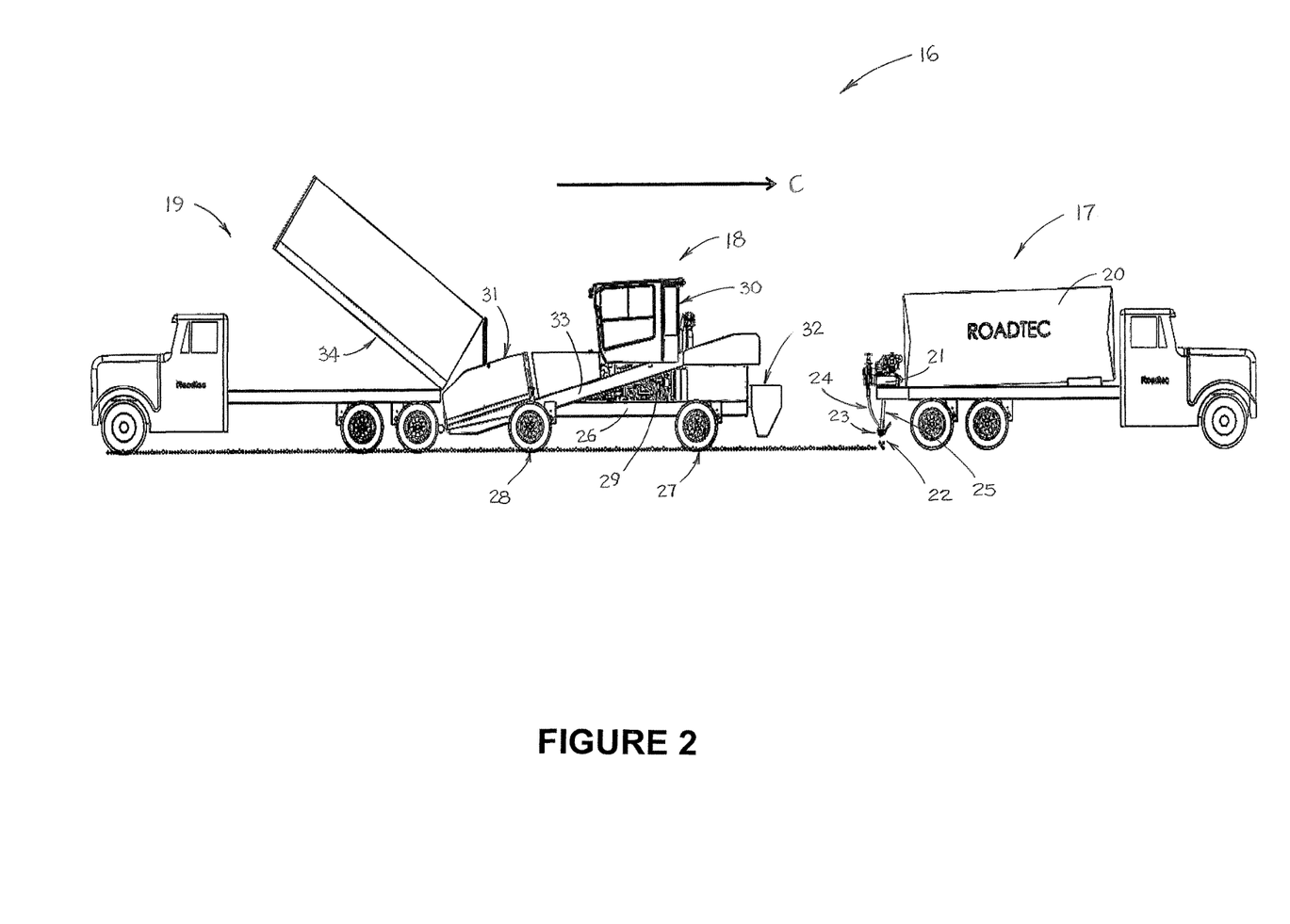
FIG. 2 is a side view of a chip sealing train according to a first embodiment of the invention.
Figure 3:
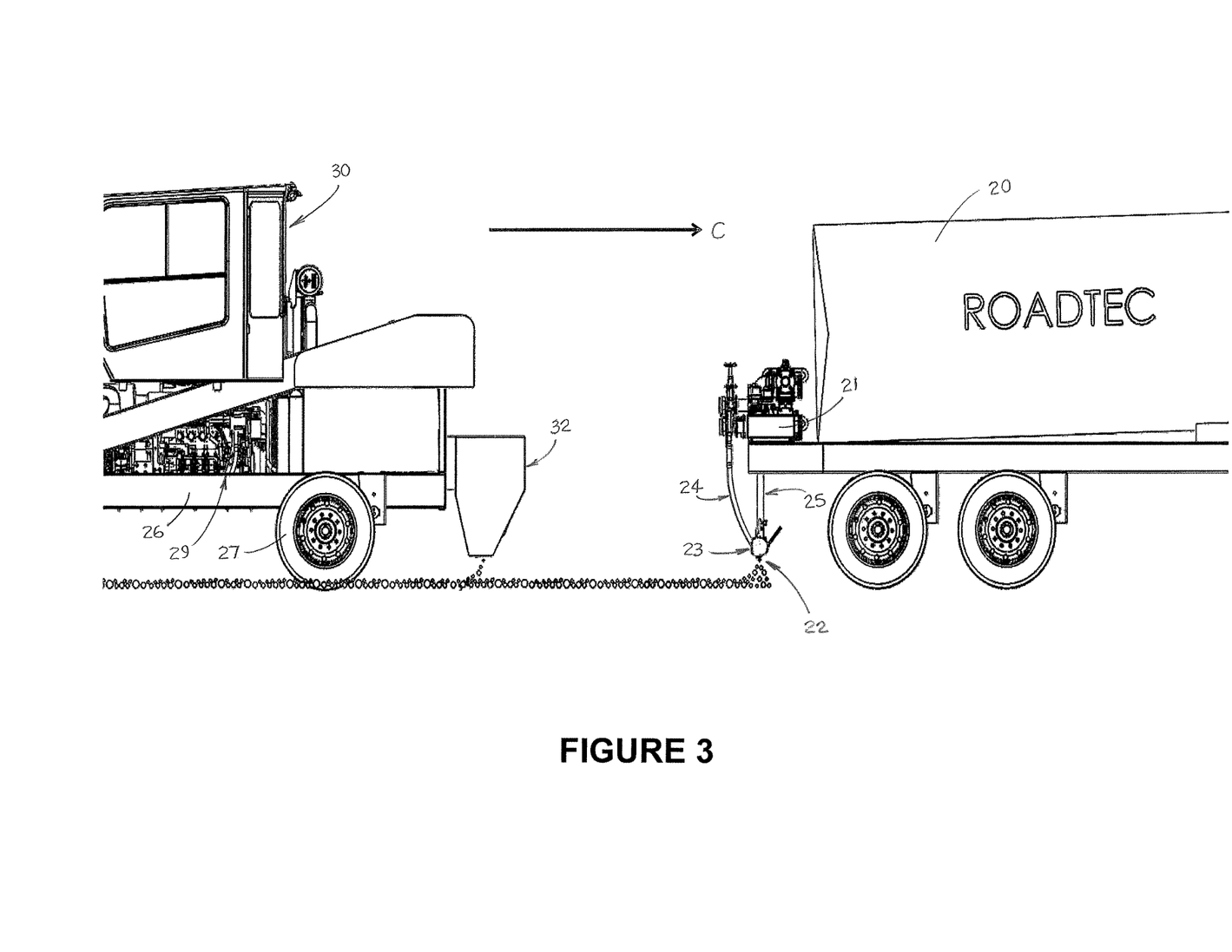
FIG. 3 is an enlarged view of a portion of the chip sealing train illustrated in FIG. 2.

A first embodiment 16 of a chip sealing train that is adapted to operate according to the invention is illustrated in FIGS. 2 and 3. Chip sealing train 16 includes modified liquid asphalt cement supply truck 17, conventional chip spreader 18 (which is substantially similar to chip spreader 10) and conventional chip supply dump truck 19. Modified liquid asphalt cement supply truck 17 includes asphalt cement tank 20 for containing hot liquid asphalt cement, water tank 21 and a foam dispersal assembly comprising spray bar 22 that extends across the roadway (perpendicular to the plane of FIGS. 2 and 3). The foam dispersal assembly includes foaming chamber 23, asphalt cement supply line 24 that is in fluid communication with asphalt cement tank 20 and the foaming chamber, and water supply line 25 that is in fluid communication with water tank 21 and foaming chamber 23. Modified liquid asphalt cement supply truck 17 also includes means for heating the foaming chamber and suitable valves and pumps to pump the water and asphalt cement into the foaming chamber at a desired ratio.

Chip spreader 18 is a self-propelled vehicle having frame 26 that is supported by front wheel assembly 27 and rear wheel assembly 28. The wheel assemblies are operatively connected to an engine 29 that is located beneath operator's station 30. Suitable controls and controllers are provided in the operator's station to operate all of the components of chip spreader 18 and to drive it in chip spreading direction "C" by an operator in operator's station 30 who is facing in the chip spreading direction. Chip spreader 18 has receiving hopper 31 on its rear end and spreader assembly 32 on its front end. Receiving hopper 31 is adapted to receive chips from chip supply dump truck 19, and conveyor assembly 33 is adapted to convey these chips from receiving hopper 31 to spreader assembly 32, which disperses the chips across the roadway atop the newly discharged foamed asphalt cement. A conventional hitch assembly (not shown) may be located on the rear end of chip spreader 18 for coupling the chip spreader to the rear end of chip supply dump truck 19. Since the receiving hopper can only accommodate a portion of the load of the chip supply dump truck, the dump bed 34 of supply truck 19 is raised and the chip spreader is coupled to the supply truck for a period of time sufficient to unload the chips from the dump truck as chip spreader 18 travels in chip spreading direction "C" pulling the dump truck backwards and as chips are conveyed from the receiving hopper to the chip spreader assembly on the front end of chip spreader 18.

Figure 4:
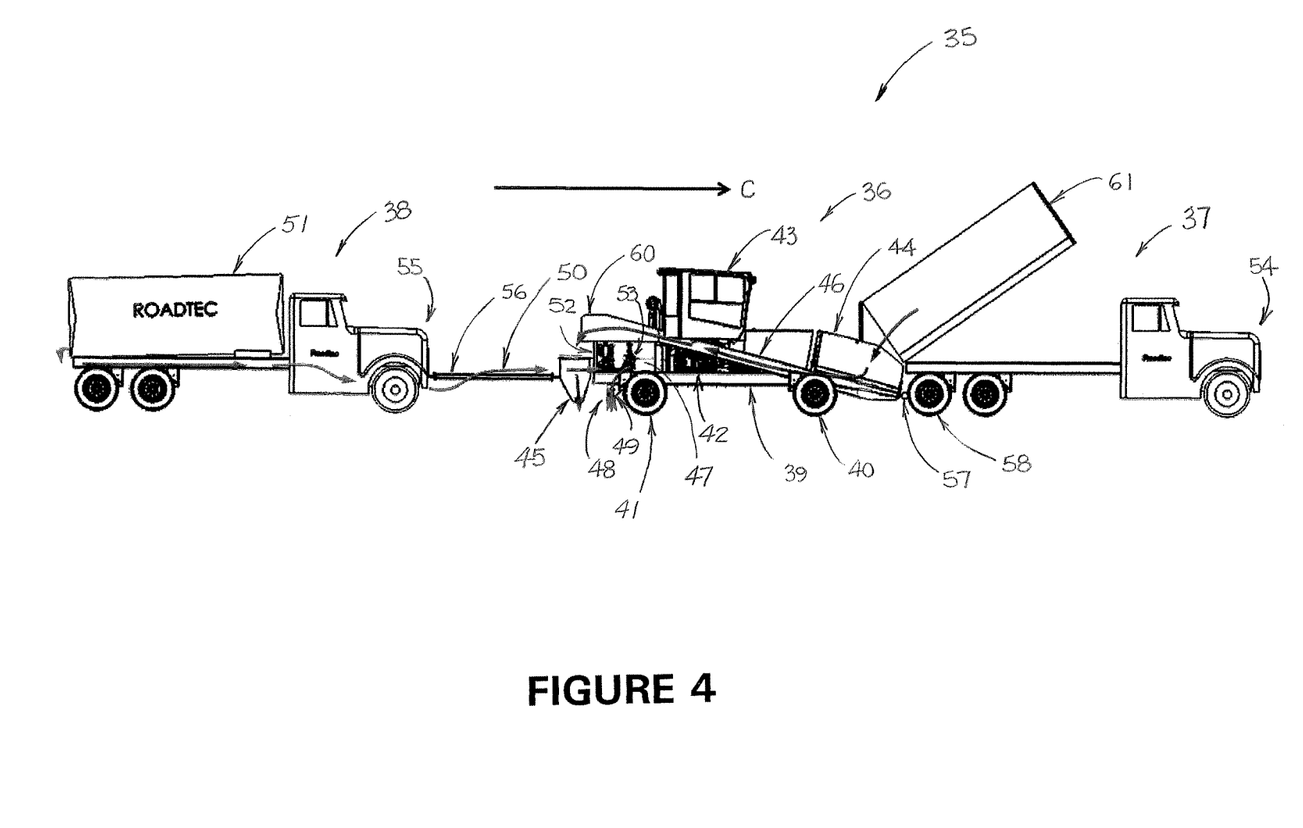
FIG. 4 is a side view of a chip sealing train according to a second embodiment of the invention.
Figure 5:
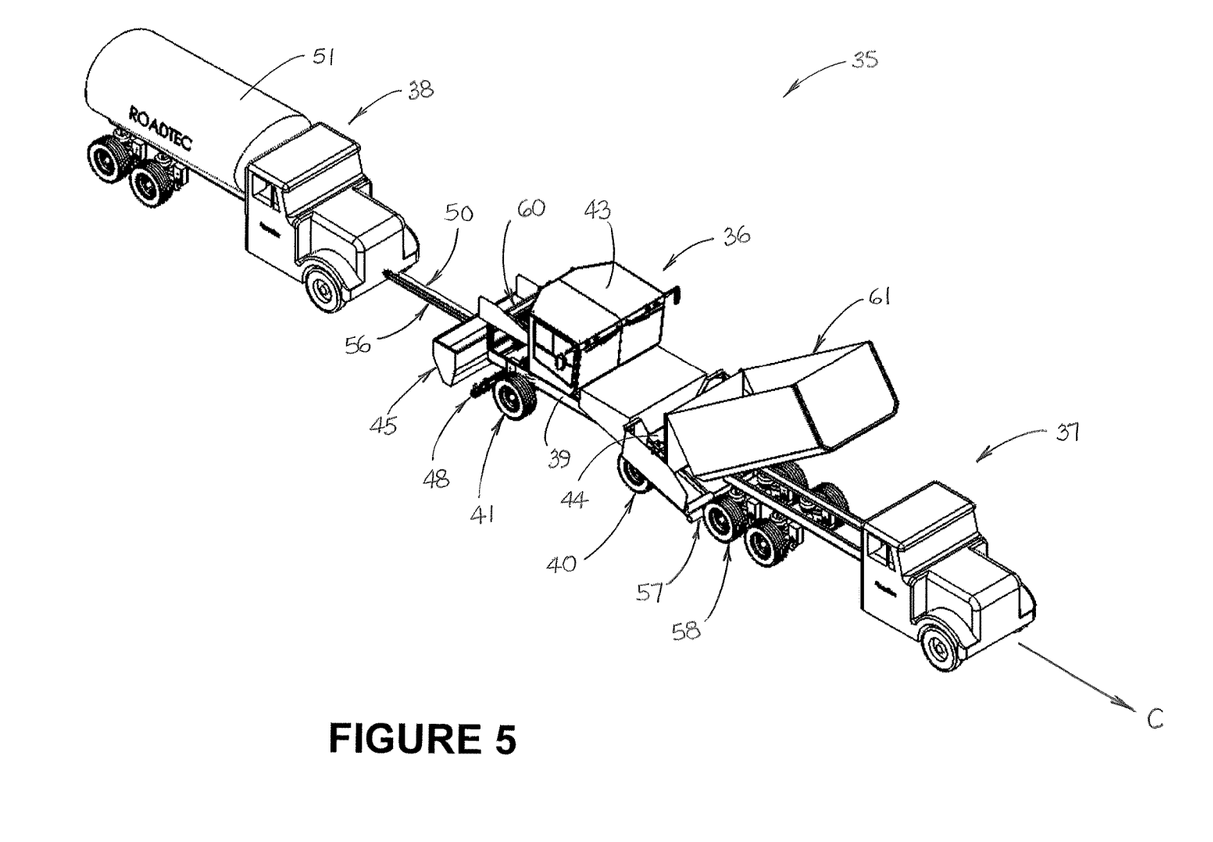
FIG. 5 is a perspective view of the chip sealing train illustrated in FIG. 4.

A second embodiment 35 of a chip sealing train that is adapted to operate according to the invention is shown in FIGS. 4 and 5. This embodiment of the invention employs a modified chip spreader 36 that permits chip sealing to be carried out without having the wheels of any vehicle drive on the chip-free asphalt composition on the roadway surface, while allowing all three vehicles in the chip sealing train to travel with the operator of each vehicle facing forward in the chip spreading direction "C". As shown in FIGS. 4 and 5, chip sealing train 35 includes, in addition to modified chip spreader 36, chip supply dump truck 37 and liquid asphalt cement supply truck 38. Modified chip spreader 36 is a self-propelled vehicle having frame 39 that is supported by front wheel assembly 40 and rear wheel assembly 41. The wheel assemblies are operatively connected to an engine 42 that is located beneath operator's station 43. Suitable controls and controllers are provided in the operator's station to operate all of the components of modified chip spreader 36 and to drive it in chip spreading direction "C" by an operator who is facing forward as the machine moves in the chip spreading direction. Modified chip spreader 36 also has receiving hopper 44 on its front end, a spreader assembly including a spreader hopper 45 on its rear end, and conveyor assembly 46 for conveying stone chips from receiving hopper 44 to the spreader assembly.

Modified chip spreader 36 includes water tank 47 and a foam dispersal assembly comprising spray bar 48 that extends across the roadway (perpendicular to the plane of FIG. 4) near the rear end of modified chip spreader 36. The foam dispersal assembly includes foaming chamber 49 and a water supply line (not shown, but substantially similar to water supply line 25 shown in FIGS. 2 and 3) that is in fluid communication with water tank 47 and the foaming chamber. The foam dispersal assembly also includes asphalt cement supply line 50 that is in fluid communication with asphalt cement tank 51 on asphalt cement supply truck 38 and foaming chamber 49. Modified chip spreader 36 also includes asphalt cement pump 52 for pumping asphalt cement from asphalt cement tank 51 into foaming chamber 49 and water pump 53 for pumping water from water tank 47 into the foaming chamber. Modified chip spreader 36 also includes means for heating the foaming chamber and suitable valves and controls to permit the introduction of water and asphalt cement into the foaming chamber at a desired ratio. In other embodiments of the invention (not shown), the asphalt cement pump may be located on asphalt cement supply truck 38 instead of on chip spreader 36. Spray bar 48 is located in front of spreader hopper 45, and is adapted to dispense foamed asphalt cement onto the surface of a roadway in advance of the discharge of stone chips on the roadway.

Although it is not essential that modified chip spreader 36 be operatively attached to chip supply dump truck 37 and to asphalt cement supply truck 38, such a configuration of the chip sealing train is preferred. Such a configuration will permit the operator of the modified chip spreader to easily control the rate of advance of the vehicular components of the chip sealing train as it carries out a chip sealing operation.

Chip supply dump truck 37 is a conventional dump truck having a front end 54 adjacent to which is an operator's cab. Chip supply dump truck 37 is adapted to haul stone chips and is preferably equipped with a conventional hitch coupler (not shown) for attachment to a hitch assembly (also not shown, but similar to hitch assembly 15 on chip spreader 10) on the front end of modified chip spreader 36. Asphalt cement supply truck 38 is a conventional tanker truck having a front end 55 adjacent to which is an operator's cab. Asphalt cement supply truck 38 is adapted to haul hot liquid asphalt cement that is suitable for foaming. Preferably, modified chip spreader 36 is equipped with tow bar 56 on its rear end that is attached to a tow-bar hitch assembly on front end 55 of asphalt cement supply truck 38. It is also preferred that modified chip spreader 36 be equipped with a roller assembly 57 on its front end (similar to those found on asphalt paving machines) that can be engaged by rear wheel assembly 58 of chip supply truck 37 as dump bed 59 is raised to discharge stone chips into receiving hopper 44. As chip supply truck 37 unloads stone chips into receiving hopper 44, conveyor assembly 46 will carry the stone chips upwardly and off upper end 60 of conveyor assembly 46 into spreader hopper 45 of the spreader assembly.

When the chip supply dump truck and the asphalt cement supply truck are operatively attached to the preferred modified chip spreader, and dump bed 61 of chip supply truck 37 is raised, stone chips will slide and/or fall into receiving hopper 44 of modified chip spreader 36. As the preferred modified chip spreader is driven along the roadway in the chip spreading direction, pushing the chip supply dump truck and pulling the asphalt cement supply truck, conveyor assembly 46 on the modified chip spreader is operated to convey stone chips from receiving hopper 44 to the spreader assembly, and asphalt cement pump 52 and water pump 53 are operated to pump asphalt cement from supply tank 51 of the asphalt cement supply truck and water from water tank 47 to foaming chamber 49 of the spray assembly. The spray assembly will dispense foamed asphalt cement on the roadway and the spreader assembly will dispense stone chips out of spreader hopper 45 onto the newly applied foamed asphalt cement across the roadway.

Figure 6:
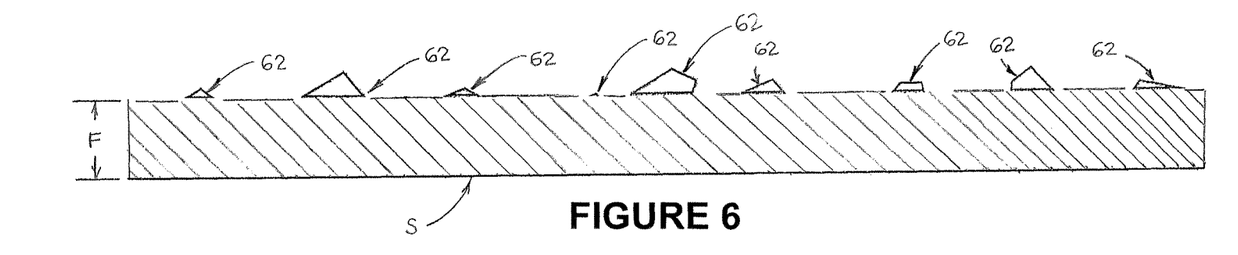
FIG. 6 is an illustration of chips on a roadway that are partially engulfed by foamed asphalt cement immediately after being deposited on a roadway according to the invention.
Figure 7:
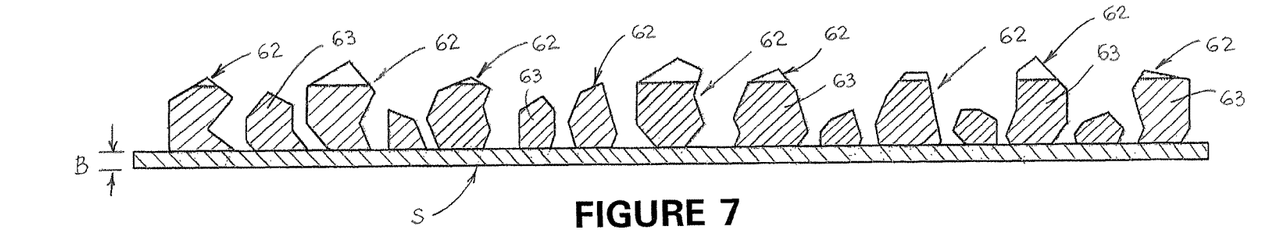
FIG. 7 illustrates the partial coverage of the chips by foamed asphalt cement even after the foam has begun to break down.
Figure 8:
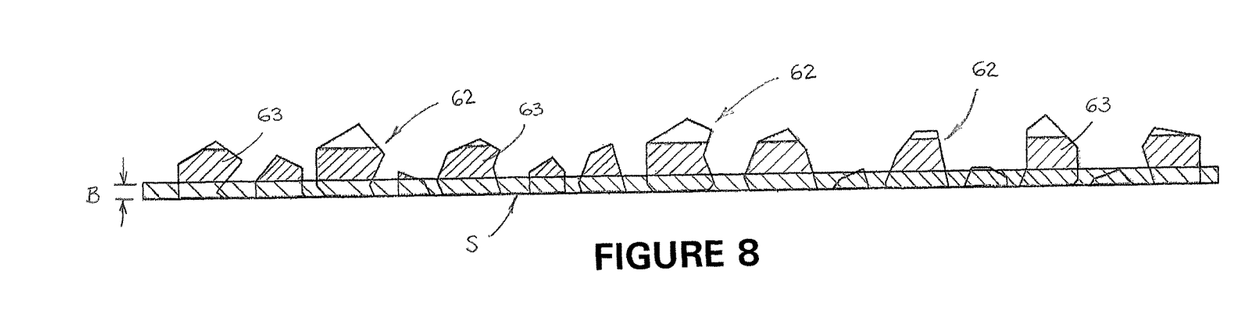
FIG. 8 illustrates the chip arrangement shown in FIGS. 6 and 7 after the chips have been pressed into the roadway surface by a mechanical roller.

FIGS. 6-8 illustrate a chip seal that may be obtained according to the invention. Because the foamed asphalt cement on the roadway surface "S" has a much greater volume than asphalt cement or asphalt cement emulsions, its initial depth on the roadway, defined by the dimension "F", will engulf the chips 62 on the roadway, as shown in FIG. 6. Furthermore, because the foamed asphalt cement has a greater viscosity than does an asphalt cement emulsion, it will tend to cling to chips 62 on the roadway, as shown by the hatched areas 63, even as the foam breaks down to its base level defined by the dimension "B", as shown in FIG. 7. Even when the chip seal is rolled by a mechanical roller, as shown in FIG. 8, sufficient binder 63 remains on the chips so that any that are dislodged by traffic on the roadway will quickly reattach themselves to the chip sealed road. What results from the invention, therefore, is a chip seal that is more durable and less likely to bleed over than conventional chip seals.

Although this description contains many specifics, these should not be construed as limiting the scope of the invention but as merely providing an illustration of the presently preferred embodiments thereof, as well as the best mode contemplated by the inventors of carrying out the invention. The invention, as described and claimed herein, is susceptible to various modifications and adaptations as would be appreciated by those having ordinary skill in the art to which the invention relates.

What is claimed is:

1. A chip sealing train for use in carrying out a chip sealing operation on a roadway, said chip sealing train comprising:
   (a) a chip supply dump truck having a front end and a rear end, and further comprising a dump bed that is adapted to carry stone chips, said dump bed being adapted to be raised so that stone chips carried therein will slide out of the dump bed;
   (b) an asphalt cement supply truck that is adapted to carry liquid asphalt cement, said asphalt cement supply truck comprising an asphalt cement supply tank;
   (c) a chip spreader which:
      (i) includes a receiving hopper for receiving the stone chips from the raised dump bed of the chip supply dump truck;
      (ii) includes a spreader assembly which is adapted to dispense the stone chips onto the roadway;
      (iii) includes a conveyor assembly for conveying the stone chips from the receiving hopper to the spreader assembly;
   (d) a water tank;
   (e) a foam dispersal assembly comprising:
      (i) a foaming chamber;
      (ii) an asphalt cement supply line that is in fluid communication with the asphalt cement supply tank and the foaming chamber;
      (iii) an asphalt cement pump for pumping asphalt cement from the asphalt cement supply tank into the foaming chamber;
      (iv) a water supply line that is in fluid communication with the water tank and the foaming chamber;
      (v) a water pump for pumping water from the water tank into the foaming chamber;
      (vi) a spray bar that is adapted to dispense foamed asphalt cement from the foaming chamber onto the surface of the roadway in front of the spreader assembly.

2. The chip sealing train of claim 1 wherein the water tank, foaming chamber, asphalt cement pump, water pump and spray bar are located on the asphalt cement supply truck.

3. The chip sealing train of claim 2 wherein:
   (a) the asphalt cement supply truck has a front end and a rear end;
   (b) the water tank, foaming chamber, asphalt cement pump, water pump and spray bar are located on the rear end of the asphalt cement supply truck.

4. The chip sealing train of claim 1 wherein the water tank, foaming chamber, asphalt cement pump, water pump and spray bar are located on the chip spreader.

5. The chip sealing train of claim 1 wherein:
   (a) the chip spreader has a front end and a rear end, and is adapted to be driven along the roadway with its front end leading in a chip spreading direction;
   (b) the receiving hopper is located on the front end of the chip spreader;
   (c) the spreader assembly comprises a spreader hopper on the rear end of the chip spreader;
   (d) the foam dispersal assembly is located near the rear end of the chip spreader and is adapted to dispense foamed asphalt cement from the foaming chamber onto the surface of the roadway in front of the spreader assembly.

6. The chip sealing train of claim 5 wherein:
   (a) the asphalt cement supply truck has a front end and a rear end;
   (b) the front end of the asphalt cement supply truck is adapted to be operatively attached to the rear end of the chip spreader.

7. The chip sealing train of claim 5 wherein the front end of the chip spreader is adapted to engage the rear end of the chip supply dump truck.

8. The chip sealing train of claim 7 wherein:
   (a) the chip supply dump truck includes a rear wheel assembly;
   (b) the chip spreader includes a roller assembly on its front end that is adapted to be engaged by the rear wheel assembly of the chip supply dump truck.

9. A method for carrying out a chip sealing operation on a roadway, said method comprising:
   (a) providing a chip supply dump truck having a dump bed that is adapted to carry stone chips, said dump bed being adapted to be raised so that stone chips carried therein will slide out of the dump bed;
   (b) providing an asphalt cement supply truck that is adapted to carry liquid asphalt cement, said asphalt cement supply truck comprising an asphalt cement supply tank;
   (c) providing a self-propelled chip spreader which:
      (i) includes a receiving hopper for receiving the stone chips from the raised dump bed of the chip supply dump truck;
      (ii) includes a spreader assembly which is adapted to dispense the stone chips onto the roadway;
      (iii) includes a conveyor assembly for conveying the stone chips from the receiving hopper to the spreader assembly;
   (d) providing a water tank;
   (e) providing a foam dispersal assembly comprising:
      (i) a foaming chamber;
      (ii) an asphalt cement supply line that is in fluid communication with the asphalt cement supply tank and the foaming chamber;
      (iii) an asphalt cement pump for dispensing asphalt cement from the asphalt cement supply tank into the foaming chamber;
      (iv) a water supply line that is in fluid communication with the water tank and the foaming chamber;
      (v) a water pump for dispensing water from the water tank into the foaming chamber;

(vi) a spray bar that is adapted to dispense foamed asphalt cement from the foaming chamber onto the surface of the roadway in front of the spreader assembly;
(f) driving the self-propelled chip spreader along the roadway in the chip spreading direction while:
 (i) raising the dump bed of the chip supply truck so that stone chips carried therein will slide out of the dump bed into the receiving hopper of the self-propelled chip spreader;
 (ii) pumping asphalt cement and water into the foaming chamber to create foamed asphalt cement;
 (iii) operating the foam dispersal assembly to dispense foamed asphalt cement from the foaming chamber onto the surface of the roadway in front of the spreader assembly;
 (iv) operating the conveyor assembly to convey the stone chips from the receiving hopper to the spreader assembly;
 (v) operating the spreader assembly to dispense the stone chips onto the roadway.

10. The method of claim 9 which includes:
(a) operatively attaching the self-propelled modified chip spreader to the asphalt cement supply truck;
(b) operatively attaching the self-propelled modified chip spreader to the chip supply dump truck;
(c) driving the self-propelled modified chip spreader along the roadway in the chip spreading direction, pushing the chip supply dump truck and pulling the asphalt composition supply truck.

* * * * *